United States Patent
Zhao

(10) Patent No.: US 9,460,749 B2
(45) Date of Patent: Oct. 4, 2016

(54) I/O BALANCE PROCESSING METHOD AND DEVICE

(71) Applicant: Huawei Technologies Co., LTD., Shenzhen (CN)

(72) Inventor: Chunyang Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 14/143,729

(22) Filed: Dec. 30, 2013

(65) Prior Publication Data

US 2014/0111881 A1    Apr. 24, 2014

Related U.S. Application Data

(63) Continuation of application No. PCT/CN2012/087153, filed on Dec. 21, 2012.

(30) Foreign Application Priority Data

Dec. 21, 2011  (CN) .......................... 2011 1 0432300

(51) Int. Cl.
G06F 17/30    (2006.01)
G11B 20/12    (2006.01)
G06F 3/06    (2006.01)

(52) U.S. Cl.
CPC ........... *G11B 20/1217* (2013.01); *G06F 3/061* (2013.01); *G06F 3/064* (2013.01); *G06F 3/0608* (2013.01); *G06F 3/0644* (2013.01); *G06F 3/0689* (2013.01)

(58) Field of Classification Search
CPC ........................ G06F 17/30578; G06F 15/177
See application file for complete search history.

(56) References Cited

U.S. PATENT DOCUMENTS

| | | | |
|---|---|---|---|
| 8,612,330 B1 * | 12/2013 | Certain .................. | G06Q 30/06 705/37 |
| 2002/0129048 A1 | 9/2002 | Qiu et al. | |
| 2003/0061362 A1 * | 3/2003 | Qiu ........................ | H04N 7/165 709/229 |
| 2012/0330954 A1 * | 12/2012 | Sivasubramanian . | G06F 9/5061 707/737 |

FOREIGN PATENT DOCUMENTS

CN    102566940 A    7/2012
JP    2007-164240 A    6/2007

OTHER PUBLICATIONS

Agrawal et al., "Automating Layout of Relational Databases" Proceedings of the 19th International Conference on Data Engineering, IEEE 2003, 12 pages.
International Search Report and Written Opinion of the International Authority issued in corresponding PCT Application No. PCT/CN2012/087153; mailed Apr. 4, 2013.
Liang, Chang-ming et al. "Application of ASM to Storage in No. 1 Military Medical Project" China Academic Journal Electronic Publishing House vol. 9. Shanxi China. Sep. 28, 2007:43-45.
Ma, Li et al. "Optimization Practice of ArcSDE for Oracle" China Academic Journal Electronic Publishing House. Jul. 19, 2007: 50-53.
Ji, Yu et al. "Oracle Database Optimization Practice Terrain Data Storage" China Academic Journal Electronic Publishing House vol. 9 No. 1. Feb. 2011:50-53.
Liu Rang-guo et al. "Research and Application of High Availability Based on Mass Spatial Database" China Academic Journal Electronic Publishing House vol. 34 No. 6. Mar. 2008:263-265.
Ma, Na "Search Disk Array Storage Systems Performance Testing Software. Computer Engineering and Application." Computer Engineering and Applications. China Academic Journal Electronic Publishing House. 2010:74-78.

* cited by examiner

*Primary Examiner* — Mariela Reyes
*Assistant Examiner* — Courtney Harmon
(74) *Attorney, Agent, or Firm* — Brinks Gilson & Lione

(57) ABSTRACT

The present disclosure provides a method and device for processing I/O balance. The method includes: receiving a storage request message carrying a data table, an estimated capacity of the data table, a size of a data block corresponding to the data table, and a disk identifier indicating storage of the data table, where the data table includes at least one data file; and acquiring database information according to the estimated capacity of the data table, the size of the data block corresponding to the data table and the total number of disks corresponding to the disk identifier, generating a first shell script according to the storage request message and the database information, and creating a database according to the first shell script.

9 Claims, 4 Drawing Sheets

I/O BALANCE PROCESSING METHOD AND DEVICE

CROSS-REFERENCE TO RELATED APPLICATIONS

This application is a continuation of International Application No. PCT/CN2012/087153, filed on Dec. 21, 2012, which claims priority to Chinese Patent Application No. 201110432300.3, filed on Dec. 21, 2011, both of which are hereby incorporated by reference in their entireties.

FIELD

The present disclosure relates to the computer technology, and in particular, to a method and device for processing I/O balance.

BACKGROUND

A transaction processing performance council (Transaction Processing Performance Council, TPC for short)-C test is a basic program for testing online transaction processing performance created in a relational database. Input/output (Input/output, I/O for short) performance of a storage unit is capable of improving a utilization rate of storage, reducing the total cost of ownership (Total cost of ownership, TCO for short) and effectively avoiding a performance problem of a database, so the I/O performance of the storage unit is a major consideration in the TPC-C test.

At present, I/O balance deployment is capable of fully exerting the I/O performance of the storage unit, so database manufacturers and storage manufacturers both have I/O balance deployment solutions for database and storage. For example, some manufacturers implement I/O balance deployment by using automatic storage management (Automatic Storage Management, ASM for short) of an oracle (oracle) database (database). Specifically, an individual disk group is created on a group of independent disks, so as to implement I/O balance of a single disk group. However, an existing I/O balance deployment solution is to perform complete balance deployment on data, that is, absolute balance deployment, so large storage space of the disk is occupied, and it is difficult to analyze a specific hotspot table and hotspot data.

SUMMARY

In a first aspect, the present disclosure provides an I/O balance processing method. The method includes: performing division processing on N LUNs on disks, setting m LUNs to a data disk, and setting N-m LUNs to a reserved disk; receiving a storage request message. The storage request message includes: a data table, an estimated capacity of the data table, a size of a data block corresponding to the data table, and a disk identifier indicating storage of the data table, where the data table includes at least one data file. The method further includes: acquiring database information according to the estimated capacity of the data table, the size of the data block corresponding to the data table and the total number of disks corresponding to the disk identifier, where the database information includes: an estimated capacity of the data table in each disk corresponding to the disk identifier, the number of data files in each disk corresponding to the disk identifier, and a size of the data file; and generating a first shell script according to the storage request message and the database information, and creating a database according to the first shell script. N and m are both integers, and are both greater than or equal to 1.

In another aspect, the present disclosure provides an I/O balance processing device. The device includes: a division module, configured to perform division processing on N LUNs on disks, set m LUNs to a data disk, and set N-m LUNs to a reserved disk; a receiving module, configured to receive a storage request message, where the storage request message includes: a data table, an estimated capacity of the data table, a size of a data block corresponding to the data table, and a disk identifier indicating storage of the data table, where the data table includes at least one data file an I/O balance processing module, configured to acquire database information according to the estimated capacity of the data table, the size of the data block corresponding to the data table and the total number of disks corresponding to the disk identifier, where the database information includes: an estimated capacity of the data table in each disk corresponding to the disk identifier, the number of data files in each disk corresponding to the disk identifier, and a size of the data file; and a database creation module, configured to generate a first shell script according to the storage request message and the database information, and create a database according to the first shell script. N and m are both integers, and are both greater than or equal to 1.

The present disclosure has the following effects. Division processing is performed on N LUNs on the disks, m LUNs are set to the data disk, and N-m LUNs are set to the reserved disk; the storage request message is received, and the database information is acquired according to the estimated capacity of the data table, the size of the data block corresponding to the data table and the total number of the disks corresponding to the disk identifier in the storage request message; and then the first shell script is generated according to the storage request message and the database information, and the database is created according to the first shell script. Because the disks are divided, a relatively balanced deployment of the capacity is implemented, and less storage space of the disks is occupied, thereby improving a utilization rate of storage.

DESCRIPTION OF EMBODIMENTS

Figure 1:
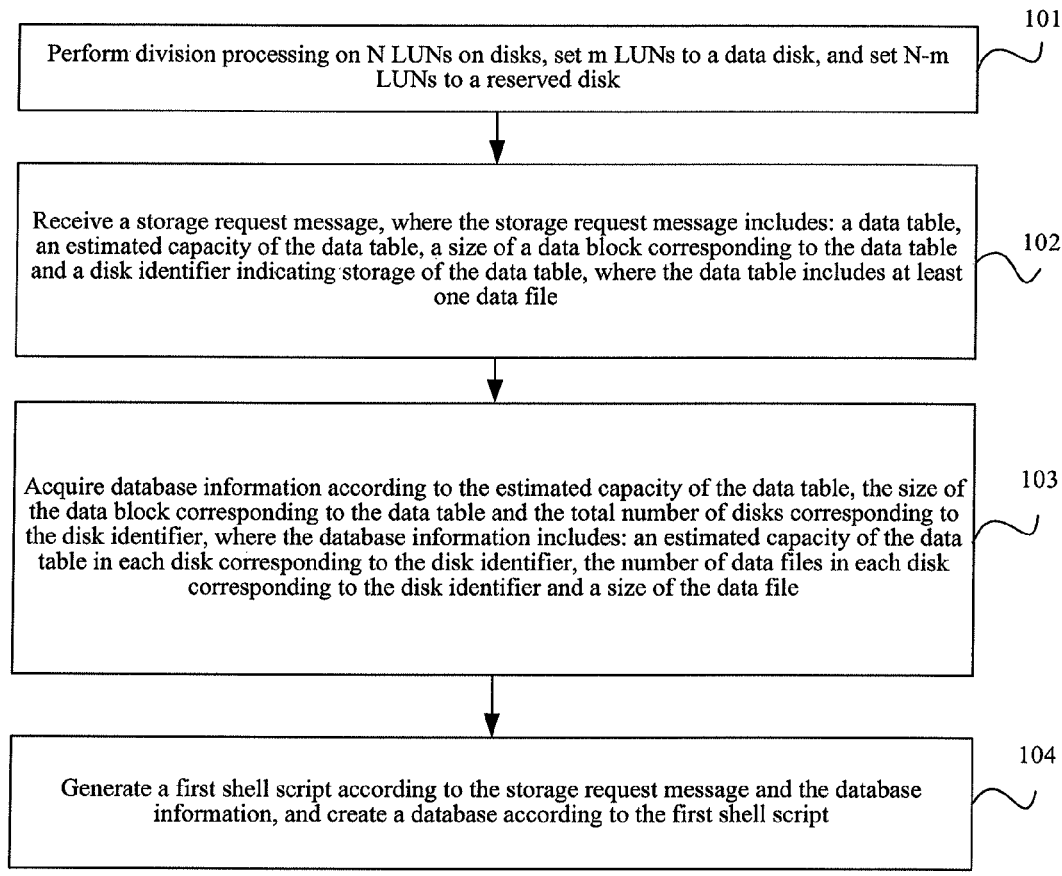
FIG. 1 is a flow chart of an embodiment of an I/O balance processing method according to the present disclosure.

FIG. 1 is a flow chart of an embodiment of an I/O balance processing method according to the present disclosure. As shown in FIG. 1, the method of this embodiment is mainly applied to a relational database, and the method includes:

Step 101: Perform division processing on N LUNs on disks, set m LUNs to a data disk, and set N-m LUNs to a reserved disk.

N and m are both integers greater than or equal to 1.

In this embodiment, hard disks corresponding to storage in the relational database are divided into groups; each group is controlled by a redundant array of independent disk (Redundant Array of Independent Disk, RAID for short) controller, and the grouped hard disks are mapped to a host server, and then each group of hard disks mapped to the host server is divided into at least one logical unit number (Logical Unit Number, LUN for short).

Figure 2:
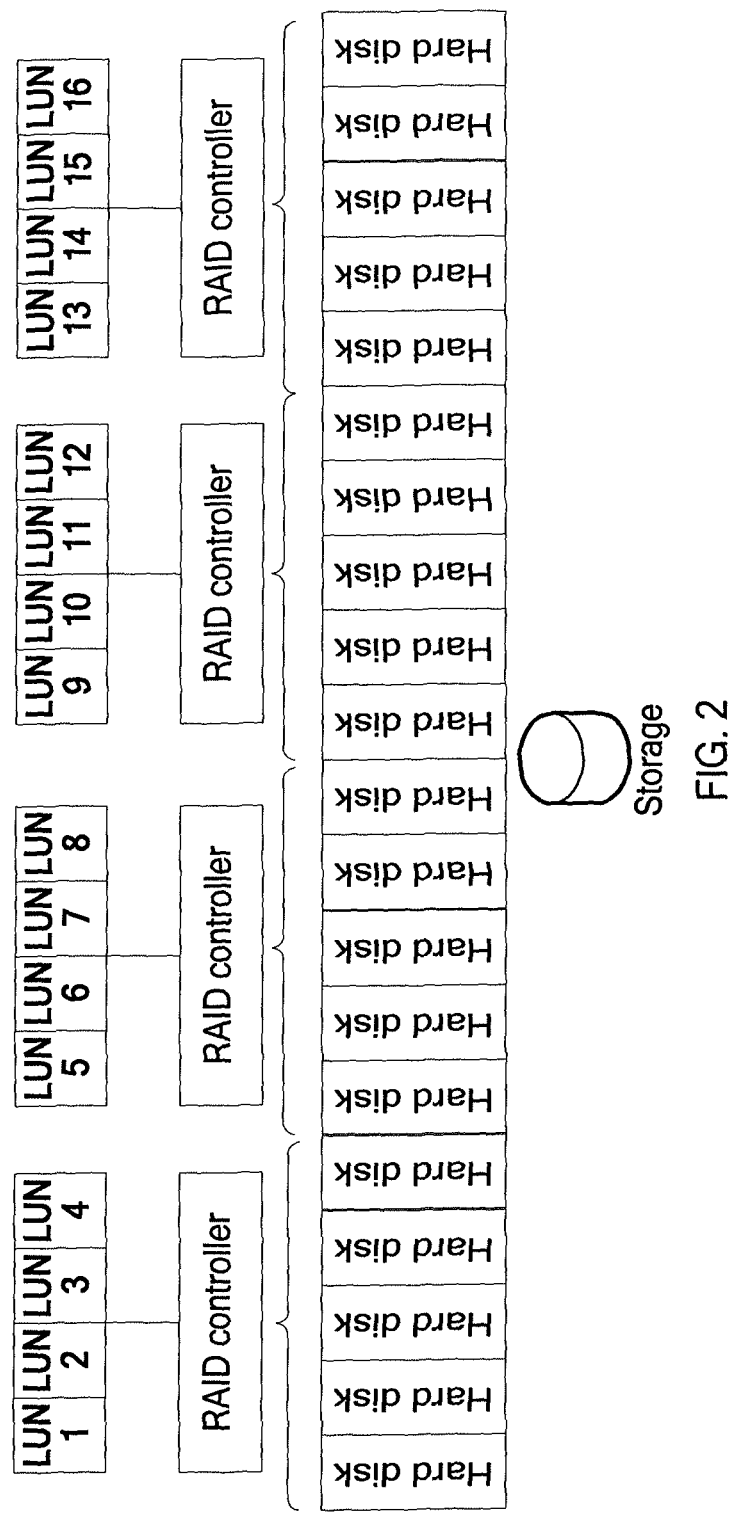
FIG. 2 is a schematic diagram of storage division in a relational database.

For example, FIG. 2 is a schematic diagram of storage division in a relational database. As shown in FIG. 2, hard disks corresponding to the storage in the relational database are divided into four groups; each group is controlled by a RAID controller, and the four groups of hard disks are mapped to a host server, and then each group of hard disks mapped to the host server is divided into four LUNs, then totally 16 LUNs are displayed on the host server. In addition, division processing may be performed on the 16 LUNs, for example, 15 LUNs are set to a data disk, and the rest one is set to a reserved disk.

In this embodiment, preferably, the data disk may store a data table (table) with larger storage capacity and higher performance, and the reserved disk may store a data table with smaller storage capacity and a lower performance requirement.

Step 102: Receive a storage request message, where the storage request message includes: a data table, an estimated capacity of the data table, a size of a data block corresponding to the data table, and a disk identifier indicating storage of the data table, where the data table includes at least one data file.

In this embodiment, the data table includes at least one data file. The estimated capacity of the data table refers to a storage space to be occupied by all data files recorded in the data table. The size of the data block corresponding to the data table refers to a data block storing the data file in the data table.

Step 103: Acquire database information according to the estimated capacity of the data table, the size of the data block corresponding to the data table and the total number of disks corresponding to the disk identifier, where the database information includes: an estimated capacity of the data table in each disk corresponding to the disk identifier, the number of data files in each disk corresponding to the disk identifier, and a size of the data file.

Step 104: Generate a first shell script according to the storage request message and the database information, and create a database according to the first shell script.

In this embodiment, division processing is performed on N LUNs on the disks, m LUNs are set to the data disk, and N-m LUNs are set to the reserved disk; the storage request message is received, and the database information is acquired according to the estimated capacity of the data table, the size of the data block corresponding to the data table and the total number of the disks corresponding to the disk identifier in the storage request message; and then the first shell script is generated according to the storage request message and the database information, and the database is created according to the first shell script. Because the disks are divided, a relatively balanced deployment of the capacity is implemented, and less storage space of the disks is occupied, thereby improving a utilization rate of storage.

Figure 3:
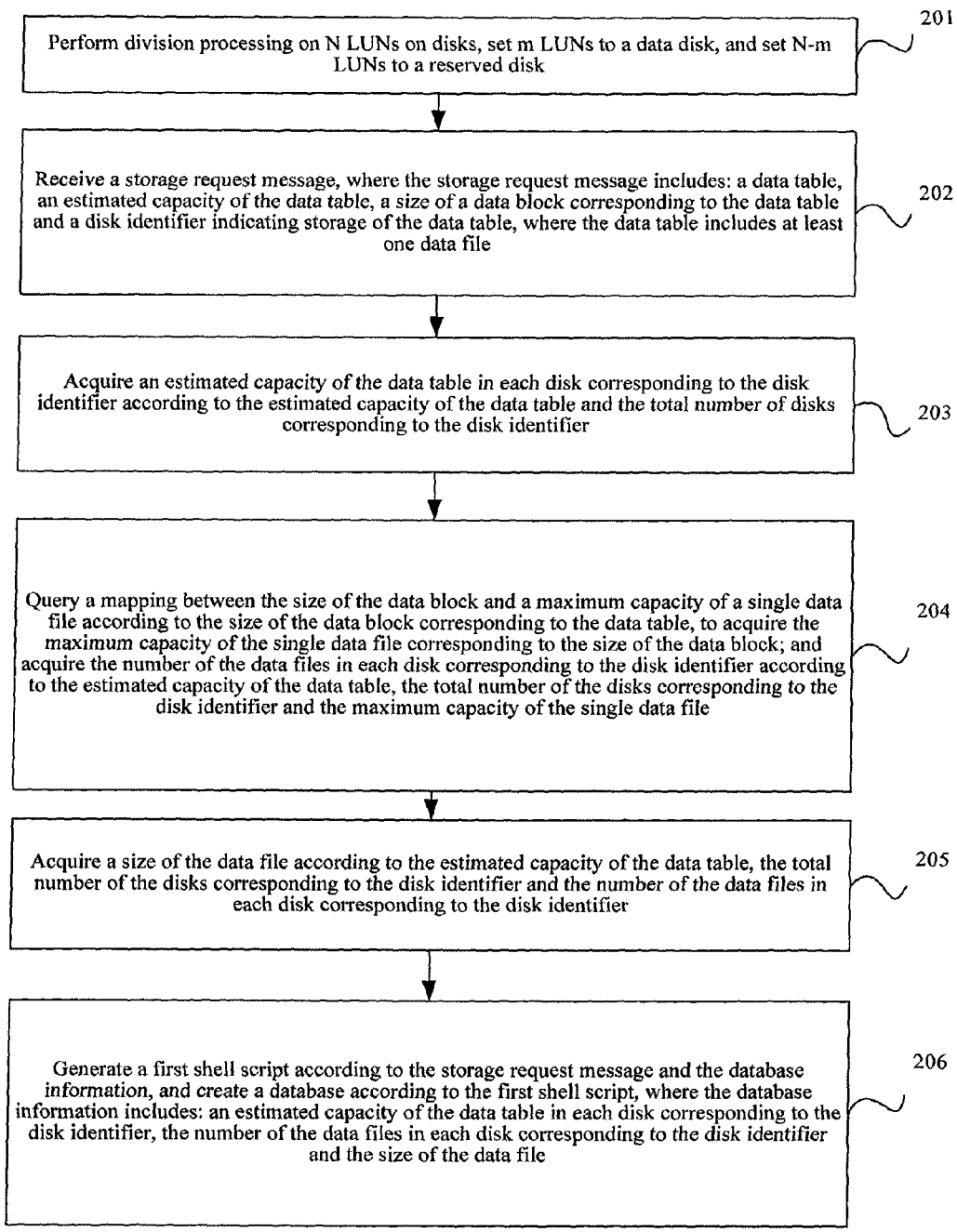
FIG. 3 is a flow chart of another embodiment of an I/O balance processing method according to the present disclosure.

FIG. 3 is a flow chart of another embodiment of an I/O balance processing method according to the present disclosure. As shown in FIG. 3, the method in this embodiment is mainly applied to a relational database, and the method includes:

Step 201: Perform division processing on N LUNs on disks, set m LUNs to a data disk, and set N-m LUNs to a reserved disk.

N and m are both integers, and are both greater than or equal to 1.

Step 202: Receive a storage request message, where the storage request message includes: a data table, an estimated capacity of the data table, a size of a data block (block) corresponding to the data table, and a disk identifier indicating storage of the data table, where the data table includes at least one data file.

Step 203: Acquire an estimated capacity of the data table in each disk corresponding to the disk identifier, according to the estimated capacity of the data table and the total number of disks corresponding to the disk identifier.

Step 204: Query a mapping between the size of the data block and a maximum capacity of a single data file according to the size of the data block corresponding to the data table, to acquire the maximum capacity of the single data file corresponding to the size of the data block; and acquire the number of data files in each disk corresponding to the disk identifier according to the estimated capacity of the data table, the total number of the disks corresponding to the disk identifier and the maximum capacity of the single data file.

Step 205: Acquire a size of the data file according to the estimated capacity of the data table, the total number of the disks corresponding to the disk identifier and the number of the data files in each disk corresponding to the disk identifier.

Step 206: Generate a first shell (shell) script according to the storage request message and database information, and create a database according to the first shell script, where the database information includes: an estimated capacity of the data table in each disk corresponding to the disk identifier, the number of the data files in each disk corresponding to the disk identifier, and the size of the data file.

In this embodiment, for example, a case that N is 20 and m is 19 is taken as an example to illustrate the solution of this embodiment in detail. Specifically, a storage request message is received, where the storage request message includes four data tables, which are a data table 1, a data table 2, a data table 3 and a data table 4. An estimated capacity of the data table 1 is 524288 M, a size of a data block corresponding to the data table 1 is 2 K, and a disk identifier indicating storage of the data table 1 is a data disk identifier. An estimated capacity of the data table 2 is 1048576 M, a size of a data block corresponding to the data table 2 is 16 K, and a disk identifier indicating storage of the data table 2 is a data disk identifier. An estimated capacity of the data table 3 is 50 M, a size of a data block corresponding to the data table 3 is 2 K, and a disk identifier indicating storage of the data table 3 is a reserved disk identifier. An estimated capacity of the data table 4 is 20480 M, a size of a data block corresponding to the data table 4 is 2 K, and a disk identifier indicating storage of the data table 4 is a reserved disk identifier.

For the data table 1, according to the estimated capacity of the data table 1 and the total number of data disks, an estimated capacity of the data table 1 in each data disk is equal to 524288 M/19=27594.10526 M; a mapping between the size of the data block and a maximum capacity of a single data file is queried according to the size of the data block corresponding to the data table 1, to acquire the maximum capacity of the single data file corresponding to the size of the data block. Preferably, in this embodiment, the mapping between the size of the data block and the maximum capacity of the single data file are shown in Table 1 below:

TABLE 1

| Data block | Maximum capacity of single data file |
|---|---|
| 2K | 8 G |
| 16K | 64 G |

The size of the data block corresponding to the data table 1 is 2 K, and Table 1 is queried, to acquire that the maximum capacity of the single data file is 8 G, and then, the number of data files in each data disk is acquired according to the estimated capacity of the data table 1, the total number of data disks and the maximum capacity of the single data file. A specific implementation manner thereof may be as follows: number of the data files in each data disk=[524288 M/19/8 G]=[3.368]=4, where the symbol [ ] indicates rounding up. Then, size of the data file=524288 M/19/4=6898.526316 M is acquired according to the estimated capacity of the data table 1, the total number of the data disks and the number of the data files in each data disk.

For the data table 3, according to the estimated capacity of the data table 3 and the total number of reserved disks, estimated capacity of the data table 1 in each reserved disk=50 M/1=50 M. The size of the data block corresponding to the data table 3 is 2 K, then Table 1 is queried, to acquire that a maximum capacity of a single data file corresponding to the size of the data block is 8 G, and then, the number of data files in each reserved disk is acquired according to the estimated capacity of the data table 3, the total number of the reserved disks and the maximum capacity of the single data file. A specific implementation manner thereof may be as follows: number of the data files in each reserved disk=[50 M/1/8 G]=[0.006]=1, where the symbol [ ] indicates rounding up. Then, size of the data file=50 M/1/1=50 M is acquired according to the estimated capacity of the data table 3, the total number of the reserved disks and the number of the data files in each reserved disk.

In addition, because the data table 2 is stored in a data disk, the implementation principle of the data table 2 is similar to that of the data table 1, and because the data table 4 is stored in a reserved disk, the implementation principle of the data table 4 is similar to that of the data table 3, so the details are not described here again. Specifically, storage request information and database information of the data table 1 to the data table 4 are shown Table 2 below:

TABLE 2

| Data table | Estimated capacity (M) | BLOCK size | Estimated capacity in each disk (M) | Storage position | Size of each data file (M) | Datafile number of each LUN |
|---|---|---|---|---|---|---|
| Table1 | 524288 | 2K | 27594.10526 | Data disk | 6898.526316 | 4 |
| Table2 | 1048576 | 16K | 55188.21053 | Data disk | 55188.21053 | 1 |
| Table3 | 50 | 2K | 50 | Reserved disk | 50 | 1 |
| Table4 | 20480 | 2K | 20480 | Reserved disk | 6826.666667 | 1 |

In this embodiment, division processing is performed on N LUNs on the disks, m LUNs are set to the data disk, and N-m LUNs are set to the reserved disk; the storage request message is received, and the database information is acquired according to the estimated capacity of the data table, the size of the data block corresponding to the data table and the total number of the disks corresponding to the disk identifier in the storage request message; and then the first shell script is generated according to the storage request message and the database information, and the database is created according to the first shell script. Because the disks are divided, a relatively balanced deployment of the capacity is implemented, and less storage space of the disks is occupied, thereby improving a utilization rate of storage.

Further, in another embodiment of the present disclosure, on the basis of the method embodiment shown in FIG. 1 or FIG. 2, the method further includes:

receiving an I/O performance detection request message, where the I/O performance detection request message includes a detection disk identifier;

when the disk identifier is a reserved disk identifier, collecting first I/O information in the data disk and collecting second I/O information in the reserved disk at set sampling time points by using an input output status (Input Output Statues, IOSTAT for short); and identifying and analyzing first I/O information and second I/O information at each sampling time, and acquiring a first detection result.

In this embodiment, the first I/O information includes: read I/O information and write I/O information, where the read I/O information includes read input/output operations per second (Input/Output Operations Per Second, IOPS for short) information and read bandwidth information and so on, and the write I/O information includes write IOPS information and write bandwidth information and so on.

Further, when the disk identifier is a data disk identifier, the method may further include:

acquiring read I/O information $Rni'$ in first I/O information of each data disk by using a formula $Rni'=(Rni-Rna)/Rna$;

acquiring write I/O information $Wni'$ in the first I/O information in each data disk by using a formula $Wni'=(Wni-Wna)/Wna$; and acquiring a weighted average $Pn$ by using a formula $Pn=Krni*|Rni'|+Kwni*|Wni'|$.

$Krni=|Rni'|/(|Rni'|+|Wni'|)$, $Kwni=|Wni'|/(|Rni'|+|Wni'|)$; n indicates a sampling time; i indicates the data disk identifier; $Rni$ indicates read I/O information in first I/O information of the $i^{th}$ data disk at the sampling time n; $Rna$ indicates an average value of read I/O information in first I/O information of all data disks at the sampling time n; $Wni$ indicates write I/O information in the first I/O information of the $i^{th}$ data disk at the sampling time n; and $Wna$ indicates an average value of write I/O information in the first I/O information of all the data disks at the sampling time n.

It should be noted that, when Pn more approaches 0, it is indicated that I/O in the relational database is more balanced.

Further, the method may further include:

adjusting the storage request message and the database information according to at least one of the first detection result and the weighted average; and generating a second shell script according to the adjusted storage request message and database information, and recreating a database according to the second shell script.

In this embodiment, for example, taking Table 2 as an example, detection is performed on the reserved disk, and the following first detection result is acquired: if the data table 4 in a reserved disk has a high performance requirement, and is suitable for being stored in a data disk, the storage request message and the database information are adjusted. Specifically, the disk identifier is modified, that is, "reserved disk" is modified into "data disk". In addition, according to the estimated capacity of data table 2 and the total number of the data disks, estimated capacity of the data table 1 in each data disk=20480 M/19=1077.89 M. If the size of the data block corresponding to the data table 2 is 2 K, Table 1 is queried, to acquire that the maximum capacity of the single data file corresponding to the size of the data block is 8 G, and then, the number of the data files in each data disk is acquired according to the estimated capacity of the data table 2, the total number of the data disks and the maximum capacity of the single data file. A specific implementation manner thereof may be as follows: number of the data files in each data disk=[20480 M/19/8 G]=[0.132]=1, where the symbol [ ] indicates rounding up. Then, size of the data file=20480M/19/1=1077.89M is acquired according to the estimated capacity of the data table 2, the total number of the data disks and the number of the data files in each data disk. A storage request message and database information of the data table 4 are shown in Table 3 below:

TABLE 3

| Data table | Estimated capacity (M) | BLOCK size | Estimated capacity in each disk (M) | Storage position | Size of each datafile (M) | Datafile number of each LUN |
| --- | --- | --- | --- | --- | --- | --- |
| Table4 | 20480 | 2K | 1077.89 | Data disk | 1077.89 | 1 |

The second shell script is generated according to the adjusted storage request message and database information, and the database is recreated according to the second shell script.

In this embodiment, detection is performed on the I/O performance, an accurate and visual assessment can be performed on the I/O performance in the data table, and the storage request message and the database information are adjusted according to a detection result, and then the second shell script is generated according to the adjusted storage request message and database information, and the database is recreated according to the second shell script, so that a performance problem of the database is effectively avoided, and the TCO cost is reduced.

Figure 4:
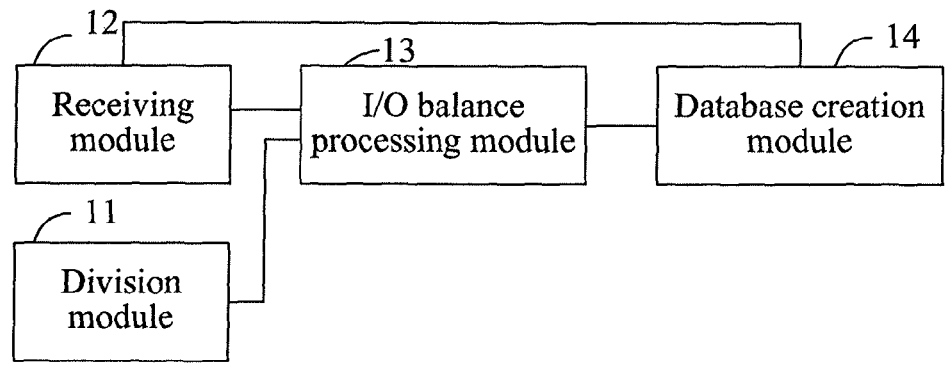
FIG. 4 is schematic structural diagram of an embodiment of an I/O balance processing device according to the present disclosure.

FIG. 4 is a structural schematic diagram of an embodiment of an I/O balance processing device according to the present disclosure. As shown in FIG. 4, the device of this embodiment includes: a division module 11, a receiving module 12, an I/O balance processing module 13 and a database creation module 14. The division module 11 is configured to perform division processing on N LUNs on disks, set m LUNs to a data disk, and set N-m LUNs to a reserved disk; the receiving module 12 is configured to receive a storage request message, where the storage request message includes: a data table, an estimated capacity of the data table, a size of a data block corresponding to the data table, and a disk identifier indicating storage of the data table, where the data table includes at least one data file; the I/O balance processing module 13 is configured to acquire database information according to the estimated capacity of the data table, the size of the data block corresponding to the data table and the total number of disks corresponding to the disk identifier, where the database information includes: an estimated capacity of the data table in each disk corresponding to the data identifier, the number of data files in each disk corresponding to the disk identifier, and a size of the data file; and the database creation module 14 is configured to generate a first shell script according to the storage request message and the database information, and create a database according to the first shell script.

N and m are both integers, and are both greater than or equal to 1.

The I/O balance processing device of this embodiment may execute the solution of the method embodiment shown in FIG. 1, and the implementation principle of the I/O balance processing device is similar to that of the method, so the details are not described here again.

In this embodiment, division processing is performed on N LUNs on the disks, m LUNs are set to the data disk, and N-m LUNs are set to the reserved disk; the storage request message is received, and the database information is acquired according to the estimated capacity of the data table, the size of the data block corresponding to the data table and the total number of the disks corresponding to the disk identifier in the storage request message; and then the first shell script is generated according to the storage request message and the database information, and the database is created according to the first shell script. Because the disks are divided, a relatively balanced deployment of the capacity is implemented, and less storage space of the disks is occupied, thereby improving a utilization rate of storage.

Figure 5:
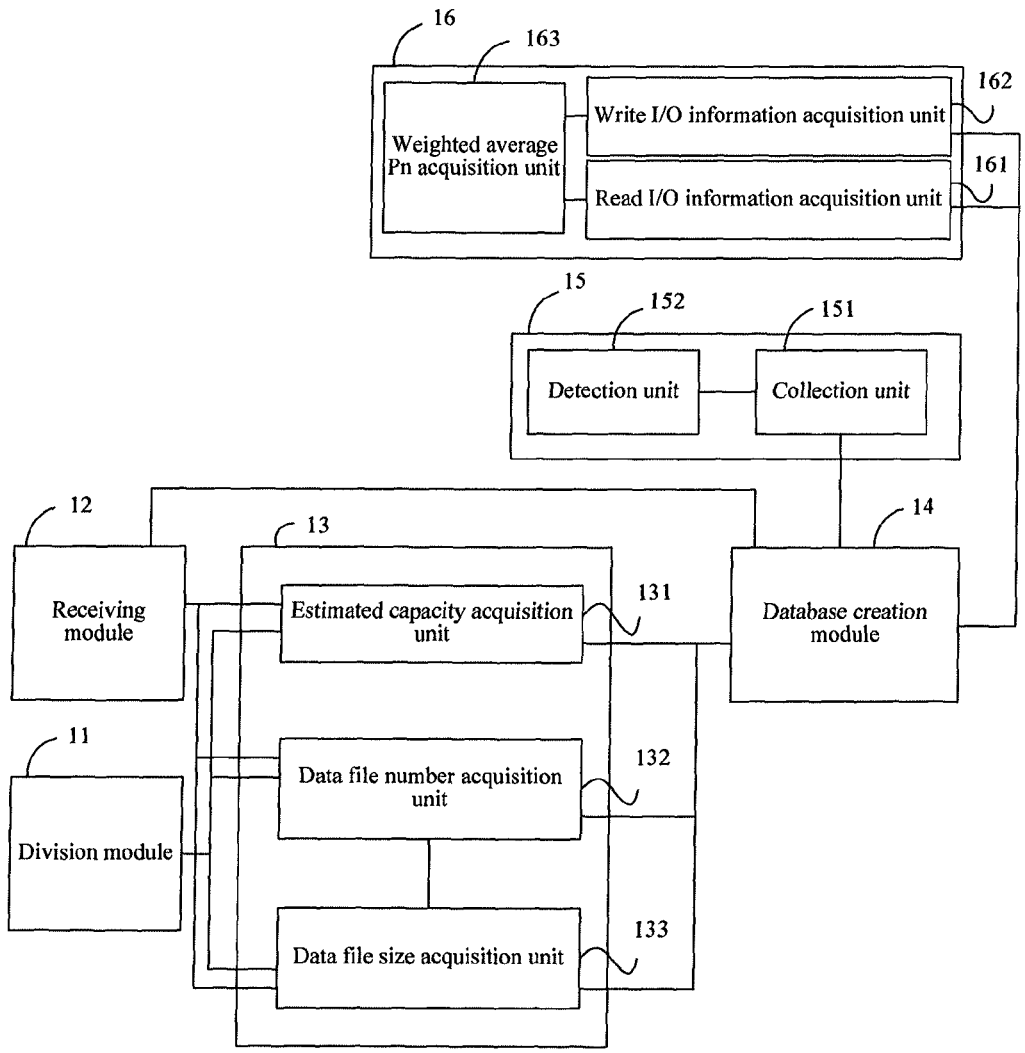
FIG. 5 is schematic structural diagram of another embodiment of an I/O balance processing device according to the present disclosure.

FIG. 5 is a structural schematic diagram of another embodiment of an I/O balance processing device according to the present disclosure. As shown in FIG. 5, on the basis of the embodiment shown in FIG. 4, the I/O balance processing module 13 includes: an estimated capacity acquisition unit 131, a data file number acquisition unit 132 and a data file size acquisition unit 133. The estimated capacity acquisition unit 131 is configured to acquire an estimated capacity of the data table in each disk corresponding to the disk identifier, according to the estimated capacity of the data table and the total number of disks corresponding to the disk identifier; the data file number acquisition unit 132 is configured to query a mapping between the size of the data block and a maximum capacity of a single data file according to the size of the data block corresponding to the data table, to acquire the maximum capacity of the single data file corresponding to the size of the data block; and acquire the number of the data files in each disk corresponding to the disk identifier according to the estimated capacity of the data table, the total number of the disks corresponding to the disk identifier and the maximum capacity of the single data file; and the data file size acquisition unit 133 is configured to acquire the size of the data file according to the estimated capacity of the data table, the total number of the disks corresponding to the disk identifier and the number of the data files in each disk corresponding to the disk identifier.

Further, when the receiving module 12 is further configured to receive an I/O performance detection request message, the I/O performance detection request message includes a detection disk identifier; when the disk identifier is a reserved disk identifier, the device further includes: a reserved disk detection module 15, including: a collection unit 151 and a detection unit 152. The collection unit 151 is configured to collect first I/O information in the data disk and collect second I/O information in the reserved disk at set sampling time points by using an IOSTAT, and the detection unit 152 is configured to identify and analyze first I/O information and second I/O information at each sampling time, and acquire a first detection result.

In addition, when the disk identifier is a reserved disk identifier, the device further includes: a data disk detection module 16, including: a read I/O information acquisition unit 161, a write I/O information acquisition unit 162 and a weighted average Pn acquisition unit 163. The read I/O information acquisition unit 161 is configured to acquire read I/O information Rni' in first I/O information of each data disk by using a formula Rni'=(Rni−Rna)/Rna; the write I/O information acquisition unit 162 is configured to acquire write I/O information Wni' in the first I/O information in each data disk by using a formula Wni'=(Wni−Wna)/Wna; and the weighted average Pn acquisition unit 163 is configured to acquire a weighted average Pn by using a formula Pn=Krni*|Rni'|+Kwni*|Wni'|.

Krni=|Rni'|/(|Rni'|+|Wni'|), Kwni=|Wni'|/(|Rni'|+|Wni'|); n indicates a sampling time; i indicates the data disk identifier; Rni indicates read I/O information in first I/O information of the $i^{th}$ data disk at the sampling time n; Rna indicates an average value of read I/O information in first I/O information of all data disks at the sampling time n; Wni indicates write I/O information in the first I/O information of the $i^{th}$ data disk at the sampling time n; and Wna indicates an average value of write I/O information in the first I/O information of all the data disks at the sampling time n.

The I/O balance processing device of this embodiment may execute the basic solution of the method embodiment shown in FIG. 3, and the implementation principle of the I/O balance processing device is similar to that of the method, so the details are not described here again.

Further, the device may further include: an adjustment module 17, configured to adjust the database information according to at least one of the first detection result and the weighted average Pn; the database creation module 14 is further configured to generate a second shell script according to the adjusted storage request message and database information, and recreate a database according to the second shell script.

In this embodiment, division processing is performed on N LUNs on the disks, m LUNs are set to the data disk, and N-m LUNs are set to the reserved disk; the storage request message is received, and the database information is acquired according to the estimated capacity of the data table, the size of the data block corresponding to the data table and the total number of the disks corresponding to the disk identifier in the storage request message; and then the first shell script is generated according to the storage request message and the database information, and the database is created according to the first shell script. Because the disk is divided, a relatively balanced deployment of the capacity is implemented, and less storage space of the disk is occupied, thereby improving a utilization rate of storage. In addition, detection is performed on the I/O performance, an accurate and visual assessment can be performed on the I/O performance in the data table, and the storage request message and the database information are adjusted according to the detection result, and then the second shell script is generated according to the adjusted storage request message and database information, and the database is recreated according to the second shell script, so that a performance problem of the database is effectively avoided, and the TCO cost is reduced.

Persons of ordinary skill in the art may understand that all or a part of the steps of the method embodiments may be implemented by a program instructing relevant hardware such as a server having a processor. The foregoing program may be stored in a computer readable storage medium accessible to the processor. When the program is run, the steps of the foregoing methods in the embodiments are performed. The storage medium includes various media that are capable of storing program codes, such as a ROM, a RAM, a magnetic disk, or an optical disk.

Finally, it should be noted that the foregoing embodiments are merely intended for describing the solutions of the present disclosure, rather than limiting the present disclosure. Although the present disclosure is described in detail with reference to the foregoing embodiments, persons of ordinary skill in the art should understand that they may still make modifications to the solutions recorded in the foregoing embodiments, or make equivalent replacements to part or all of the features thereof; and such modifications or replacements do not make the essence of corresponding solutions depart from the scope of the solutions of the embodiments of the present disclosure.

What is claimed is:

1. A method for processing I/O balance, performed by a device, comprising:
   receiving a storage request message, wherein the storage request message comprises: a data table, an estimated capacity of the data table, a size of a data block corresponding to the data table, and a disk identifier indicating storage of the data table, the data table comprising at least one data file;
   acquiring database information according to the estimated capacity of the data table, the size of the data block corresponding to the data table and the total number of disks corresponding to the disk identifier, wherein the database information comprises: an estimated capacity of the data table in each disk corresponding to the disk identifier, the number of data files in each disk corresponding to the disk identifier, and a size of the data file;
   generating a first shell script according to the storage request message and the database information, and creating a database according to the first shell script;
   when the disk identifier is a data disk identifier, acquiring read I/O information Rni' in first I/O information of each data disk by using a formula Rni'=(Rni−Rna)/Rna when the disk identifier is a data disk identifier;
   acquiring write I/O information Wni' in the first I/O information in each data disk by using a formula Wni'=(Wni−Wna)/Wna; and
   acquiring a weighted average Pn by using a formula Pn=Krni* |Rni'|+Kwni* |Wni'|, wherein Krni=|Rni'|/(|Rni'|+|Wni'|), Kwni=|Wni'|/(|Rni'|+Wni'|); n indicates a sampling time; i indicates the data disk identifier; Rni indicates read I/O information in first I/O information of the $i^{th}$ data disk at the sampling time n; Rna indicates an average value of read I/O information in first I/O information of all data disks at the sampling time n; Wni indicates write I/O information in the first I/O information of the $i^{th}$ data disk at the sampling time n; and Wna indicates an average value of write I/O information in the first I/O information of all the data disks at the sampling time n.

2. The method according to claim 1, wherein acquiring the database information according to the estimated capacity of the data table, the size of the data block corresponding to the data table and the total number of the disks corresponding to the disk identifier, wherein the database information comprises: the estimated capacity of the data table in each disk corresponding to the disk identifier, the number of the data files in each disk corresponding to the disk identifier, and the size of the data file, comprises:

acquiring the estimated capacity of the data table in each disk corresponding to the disk identifier according to the estimated capacity of the data table and the total number of the disks corresponding to the disk identifier;

querying a mapping between the size of the data block and a maximum capacity of a single data file according to the size of the data block corresponding to the data table, to acquire the maximum capacity of the single data file corresponding to the size of the data block; and acquiring the number of the data files in each disk corresponding to the disk identifier according to the estimated capacity of the data table, the total number of the disks corresponding to the disk identifier and the maximum capacity of the single data file; and acquiring the size of the data file according to the estimated capacity of the data table, the total number of the disks corresponding to the disk identifier, and the number of the data files in each disk corresponding to the disk identifier.

3. The method according to claim 1, further comprising:
receiving an I/O performance detection request message, wherein the I/O performance detection request message comprises a detection disk identifier;

when the disk identifier is a reserved disk identifier, collecting first I/O information in a data disk and collecting second I/O information in a reserved disk at set sampling time points by using an input output status; and identifying and analyzing the first I/O information and the second I/O information at each of the sampling times, and acquiring a first detection result.

4. The method according to claim 1, wherein the first I/O information and the second I/O information both comprise read I/O information and write I/O information; the read I/O information comprises read IOPS information and read bandwidth information, and the write I/O information comprises write IOPS information and write bandwidth information.

5. The method according to claim 1, further comprising:
adjusting the storage request message and the database information according to at least one of the first detection result and the weighted average Pn; and generating a second shell script according to the adjusted storage request message and database information, and recreating a database according to the second shell script.

6. A device for processing I/O balance comprising a processor and a non-volitile storage medium having program code stored therein, the processor when executing the program code:

receives a storage request message, wherein the storage request message comprises: a data table, an estimated capacity of the data table, a size of a data block corresponding to the data table, and a disk identifier indicating storage of the data table, the data table comprising at least one data file;

acquires database information according to the estimated capacity of the data table, the size of the data block corresponding to the data table and the total number of disks corresponding to the disk identifier, wherein the database information comprises: an estimated capacity of the data table in each disk corresponding to the disk identifier, the number of data files in each disk corresponding to the disk identifier, and a size of the data file;

generates a first shell script according to the storage request message and the database information, and create a database according to the first shell script;

when the disk identifier is a reserved disk identifier:
acquires read I/O information Rni' in first I/O information of each data disk by using a formula Rni'=(Rni-Rna)/Rna when the disk identifier;

acquires write I/O information Wni' in the first I/O information in each data disk by using a formula Wni'=(Wni-Wna)/Wna; and acquires a weighted average Pn by using a formula Pn=Krni*|Rni'|+Kwni* |Wni'|, wherein Krni=|Rni'|/(|Rni'|=|Wni'|), Kwni=|Wni'|/(|Rni'|+IWni'|); n indicates a sampling time; i indicates the data disk identifier. Rni indicates read I/O information in first I/O information of the $i^{th}$ data disk at the sampling time n; Rna indicates an average value of read I/O information in first I/O information of all data disks at the sampling time n; Wni indicates write I/O information in the first I/O information of the $i^{th}$ data disk at the sampling time n; and Wna indicates an average value of write I/O information in the first I/O information of all the data disks at the sampling time n.

7. The device according to claim 6, wherein the processor when executing the program code:

acquires the estimated capacity of the data table in each disk corresponding to the disk identifier according to the estimated capacity of the data table and the total number of the disks corresponding to the disk identifier;

queryies a mapping between the size of the data block and a maximum capacity of a single data file according to the size of the data block corresponding to the data table, to acquire the maximum capacity of the single data file corresponding to the size of the data block; and acquires the number of the data files in each disk corresponding to the disk identifier according to the estimated capacity of the data table, the total number of the disks corresponding to the disk identifier and the maximum capacity of the single data file; and acquires the size of the data file according to the estimated capacity of the data table, the total number of the disks corresponding to the disk identifier and the number of the data files in each disk corresponding to the disk identifier.

8. The device according to claim 6, wherein the the processor when executing the program code: receives an I/O performance detection request message, and the I/O perfromance detection request message comprises a detection disk identifier;
　　when the disk identifier is a reserved disk identifier,
　　collects first I/O information in a data disk and collects second I/O information in a reserved disk at set sampling time points by using an input output status; and
　　identifies and analyzes the first I/O information and the second I/O information at each of the sampling times, and aquires a first detection result,
　　wherein the first I/O information and the second I/O information both comprise read I/O information and write I/O information; the read I/O information comprises read IOPS information and read bandwidth information, and the I/O information comprise write IOPS information and write bandwidth information.

9. The device according to claim 6, the processor when executing the program code:
　　adjusts the storage request message and the database information according to at least one of the first detection result and the weighted average Pn; and
　　generate generates a second shell script according to the adjusted storage request message and database information, and recreating a database according to the second shell script.

\* \* \* \* \*

UNITED STATES PATENT AND TRADEMARK OFFICE
CERTIFICATE OF CORRECTION

| | | |
|---|---|---|
| PATENT NO. | : 9,460,749 B2 | Page 1 of 1 |
| APPLICATION NO. | : 14/143729 | |
| DATED | : October 4, 2016 | |
| INVENTOR(S) | : Chunyang Zhao | |

It is certified that error appears in the above-identified patent and that said Letters Patent is hereby corrected as shown below:

In the Claims

In Column 13, Claim 8, Line 10, before "a first detection result," replace "aquires" with --acquires--.

In Column 13, Claim 9, Line 22, before "generates a second shell script" delete "generate".

Signed and Sealed this
Twenty-seventh Day of March, 2018

Andrei Iancu
*Director of the United States Patent and Trademark Office*